J. B. WOOD.
FARM IMPLEMENT.
APPLICATION FILED FEB. 14, 1911.
1,117,540.
Patented Nov. 17, 1914.
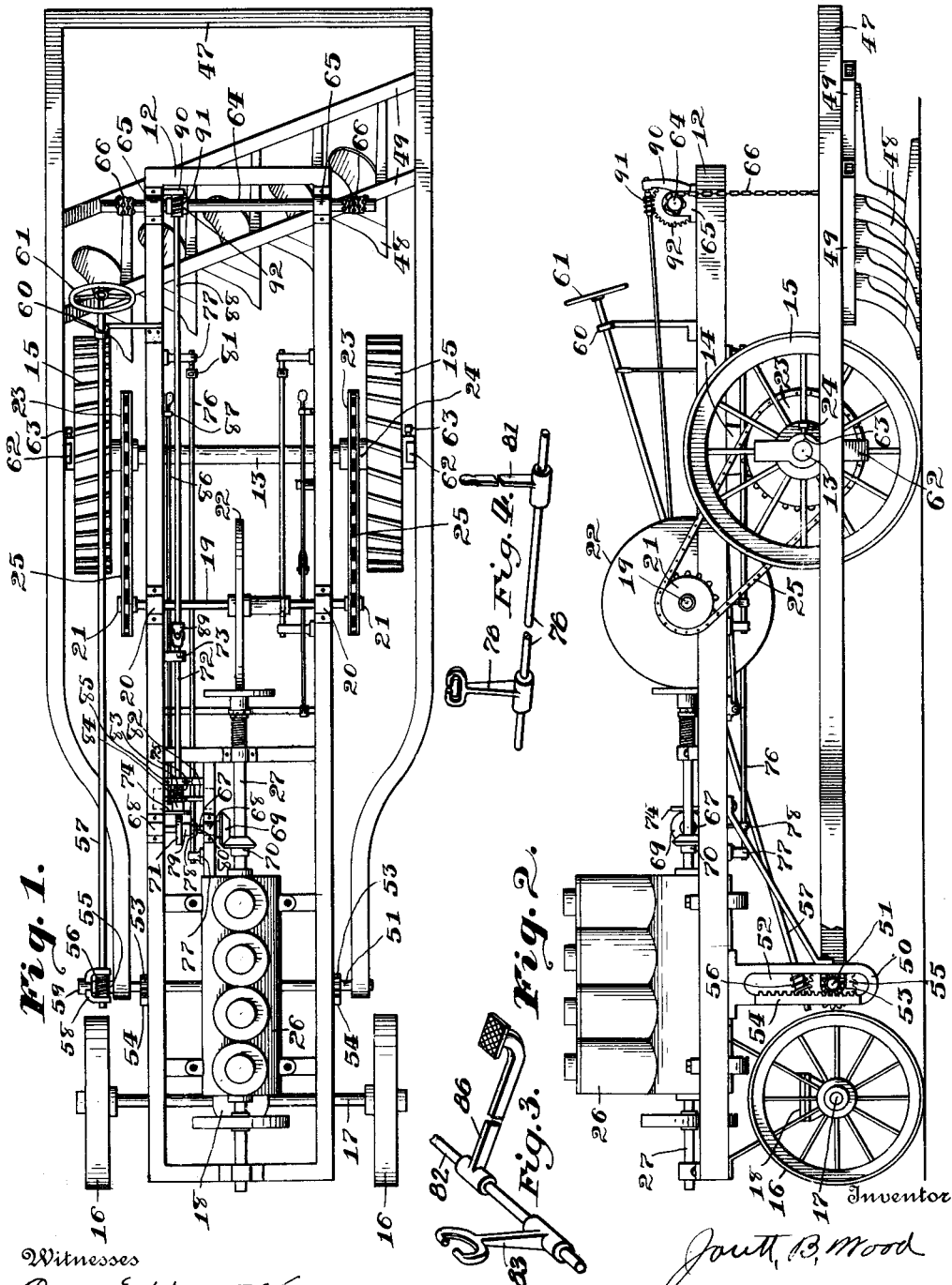

UNITED STATES PATENT OFFICE.

JARETT B. WOOD, OF OKLAHOMA, OKLAHOMA, ASSIGNOR OF ONE-HALF TO F. J. HAWK AND H. D. KNIGHT, OF OKLAHOMA, OKLAHOMA.

FARM IMPLEMENT.

1,117,540.

Specification of Letters Patent.

Patented Nov. 17, 1914.

Application filed February 14, 1911. Serial No. 608,588.

*To all whom it may concern:*

Be it known that I, JARETT B. WOOD, a citizen of the United States, residing at Oklahoma city, in the county of Oklahoma and State of Oklahoma, have invented certain new and useful Improvements in Farm Implements, of which the following is a full, clear, and exact description, reference being had to the accompanying drawings.
This invention pertains to an automobile carriage adapted to have plowing, stalk-cutting, mowing, and other mechanism attached to and operated by it.

An object of the invention is to provide an improved method of attaching the different mechanisms to the machine.

Another object is to so attach the plowing implement that the traction wheels propelling the machine will be less liable to slip on the surface of the ground.

Other objects and advantages of the invention will be set forth in the ensuing description.

Referring to the drawings: Figure 1 is a plan view of the machine, with plows attached thereto. Fig. 2 is a left-hand side elevation of the parts shown in Fig. 1. Fig. 3 is a perspective view of one of the gear controlling shafts and its attached parts.
Fig. 4 is a similar view of the gear shaft 76 and its attached parts.

Referring to the several figures, in all of which like characters of reference designate like parts, the improved machine comprises, in part, an elongated main frame-work 12, which supports other parts of the machine. This frame-work 12 has a shaft 13 journaled across under its rear portion in bearings 14 extending downward therefrom, ground or traction wheels 15 being mounted on the ends of this shaft to support it and said frame-work.

The front end of the main frame-work 12 is carried by wheels 16 mounted on the ends of the usual axle 17, this axle being pivoted to the frame-work by a fifth-wheel connection 18.

A drive-shaft 19 is journaled just above and laterally of the frame-work 12 in front of the shaft 13, in bearings 20 secured to said frame-work, said shaft having at each of its ends a sprocket wheel 21, and on its central portion a splined friction disk 22.

The sprocket wheels 21 on the ends of the drive-shaft 19 are operatively connected with larger sprocket wheels 23 on the hubs 24 of the traction wheels 15 by link belts 25, so that movement of said drive-shaft causes said traction wheels to run and propel the machine.

An engine or motor 26 of any suitable type is mounted upon the front end of the main frame-work 12, the shaft 27 of said engine extending centrally of said frame-work in a fore-and-aft direction.

In the use of the machine for plowing, a substantially U-shaped frame 47 surrounds the rear end of the machine, the terminals of said frame being curved inward at their front ends and pivoted to the front portion of the main frame-work 12 on a horizontal axis line extending laterally of the machine. A series of plows 48 is attached to the rear end of the pivoted frame 47 in the rear of the traction wheels 15, said plows being secured to cross-beams 49 which extend at an angle across the rear portion of said frame. In pivoting the front end of the frame 47, a slotted bracket 50 depends from the main frame-work 12 at each side thereof, a shaft 51 passing through the slot 52 of said brackets and through the ends of said frame 47. This shaft 51 is provided with a gear-pinion 53 at each bracket 50, each gear-pinion meshing with a toothed rack 54 on the front portion of its respective bracket. By revolving the shaft 51, the engagement of its gear-pinions 53 with the toothed racks 54 will cause it to be raised or lowered in the slots 52 of said brackets, thus raising or lowering the front end of the frame 47. For revolving this shaft 51 a worm gear-wheel 55 is mounted on its right-hand end and engaged by a worm pinion 56 on the lower front end of a shaft 57. The front end of this shaft is journaled in a cast spider 58, this spider having a hub or sleeve portion 59 revolubly embracing the end of the shaft 51. By this arrangement, the spider 58 can at all times follow the position of the shaft 57 during vertical movements of the shaft 51. The rear end of the shaft 57 extends revolubly through a standard 60 on the rear end of the main frame-work 12, and is provided with a hand-wheel 61. By turning this hand-wheel 61, the operator may raise or lower the front end of the frame 47, as necessary to gage the depth at which the plows 48 shall run in the soil. To guide the rear end of the frame 47 against undue lateral movement, the ends of the main shaft 13 are provided with vertical guide-bars 62 on the outside of the traction wheels 15, these guide-bars embracing the ends of said shaft and being secured thereto by set-screws 63. In order to raise the plows 48 out of the soil, the rear end of the frame 47 is raised. For doing this, a shaft 64 is journaled across the extreme rear end of the main frame-work 12 in bearings 65 secured to said frame-work, this shaft having suspending chains 66 wound around its ends and connected to the cross-beams 49 of the frame 47. In arranging the mechanism to revolve the shaft 64, a short shaft 67 is journaled laterally through the right-hand side of the main frame-work 12 in bearings 68 secured to said frame-work, the inner end of this shaft having a beveled gear-wheel 69 meshing with a similar gear-wheel 70 on the engine shaft 27, and having a splined friction-disk 71.

A shaft 72 is journaled along the right-hand side of the main frame-work 12 in bearings 73 secured to said frame-work, the front end of said shaft having a splined friction-disk 74. The front face of this friction disk 74 is yieldably held in frictional engagement with the edge face of the friction-disk 71 by a helical spring 75 embracing the shaft 72, so that the latter friction-disk causes the former to run said shaft. The friction-disk 71 of the shaft 67 may be shifted lengthwise of said shaft in order to bring its point of frictional engagement from, toward, or past the center of the friction face of the friction-disk 74, as necessary to increase or diminish the speed of said friction-disk 74 or reverse its movement. For shifting the friction-disk 71 along shaft 76, best shown in Fig. 4, is journaled along the right-hand side of the main frame-work 12 in bearings 77 secured to said frame-work, the front end of this shaft having an arm 78 whose bifurcated upper end straddles the hub 79 of said friction-disk and engages a circumferential groove 80 therein. The rear end of this shaft 76 is provided with an operating lever 81. In shifting the friction-disk 71, it is preferable to lessen the force of frictional engagement of the friction-disk 74 therewith. For doing this, a short shaft 82, best shown in Fig. 3, is journaled laterally under the right-hand side of the main frame-work 12, this shaft having an arm 83 whose bifurcated upper end straddles the hub 84 of the friction-disk 71 and engages a circumferential groove 85 therein. This shaft 82 has a rearwardly-extending long arm 86 whose rear end extends with freedom of vertical swinging movement through a slotted guiding bearing 87 secured to a rear portion of the main frame-work 12. By pressing downward on the rear end of this lever with the foot, the operator may release the frictional engagement of the friction-disks 71 and 74 as aforesaid, allowing the shifting movements of the friction-disk 71 above described.

In further completing the mechanism for raising the rear end of the frame 47, a shaft 88 is connected to the rear end of the shaft 72 by a universal joint 89 and extends rearward, the rear end of said shaft being journaled in an arm 90 extending up integrally from the bearing 65 aforesaid. The rear end of this shaft 88 has a worm-pinion 91 meshing with a worm gear-wheel 92 on the shaft 64 aforesaid, so that by producing and controlling movement of the shaft 72 by the means previously described, the shaft 64 may be revolved to raise, support, or lower the end of the frame 47 and the plows or other implements carried thereby.

The foregoing being a full, clear, and exact description of the invention, what I claim and desire to secure by Letters Patent is:—

1. In a machine of the class described, the combination with a vehicle, of a horizontally disposed movable frame embracing the rear of the vehicle, a soil working implement carried by the frame, means for raising and lowering the front of the frame, mechanism for raising and lowering the rear of the frame, and intermediate guides adapted to restrain the frame from undue lateral movement during the raising and lowering of such frame.

2. In a machine of the class described, the combination with a vehicle, of a U-shaped frame embracing the vehicle and pivotally supported at its forward ends, soil working devices carried by the frame, means for raising and lowering the front of the frame, mechanism for independently raising and lowering the rear of the frame, and means located intermediate the ends of the frame for guiding the latter during the raising and lowering thereof.

3. In a machine of the class described, the combination with a main frame, of a supplemental frame movably connected thereto at its front end, means including gear and rack mechanism for raising and lowering the front end of the supplemental frame, a motor mounted on the main frame, soil working implements carried at the rear of the supplemental frame, means for raising and lowering the rear end of the supplemental frame, said means including a rotating shaft, chain connections between the shaft and the rear of the supplemental frame, a gear on said shaft, a worm gear meshing with the gear on the shaft, a driving rod for the worm gear, and power transmitting connections between said rod and the motor, and intermediate means for restraining the frame against undue lateral movement during the raising and lowering of such frame.

4. The combination with a main frame, of a supplemental frame pivotally connected thereto at its front end, soil working implements carried at the rear of the supplemental frame, means for raising and lowering the rear of the supplemental frame, said means including a rotating shaft, chain connections between the shaft and the supplemental frame and means for rotating the shaft, vertically disposed guides for restraining the frame from undue lateral movement during the raising and lowering of such frame, a motor, and power transmitting connections between the motor and the shaft rotating means.

5. The combination with a vehicle including an axle shaft and a pair of ground wheels carried by the shaft, of a horizontally disposed frame embracing the rear of the vehicle, means for raising and lowering the frame, guide members arranged at the ends of the shaft and intermediate the ends of the frame and adapted to guide the frame during the raising and lowering of the latter, and soil working implements carried by the frame.

Witness my hand this 22d day of December, 1910.

JARETT B. WOOD.

Witnesses:
BESS EPPERSON,
J. C. ADAMS.